Figure 5:
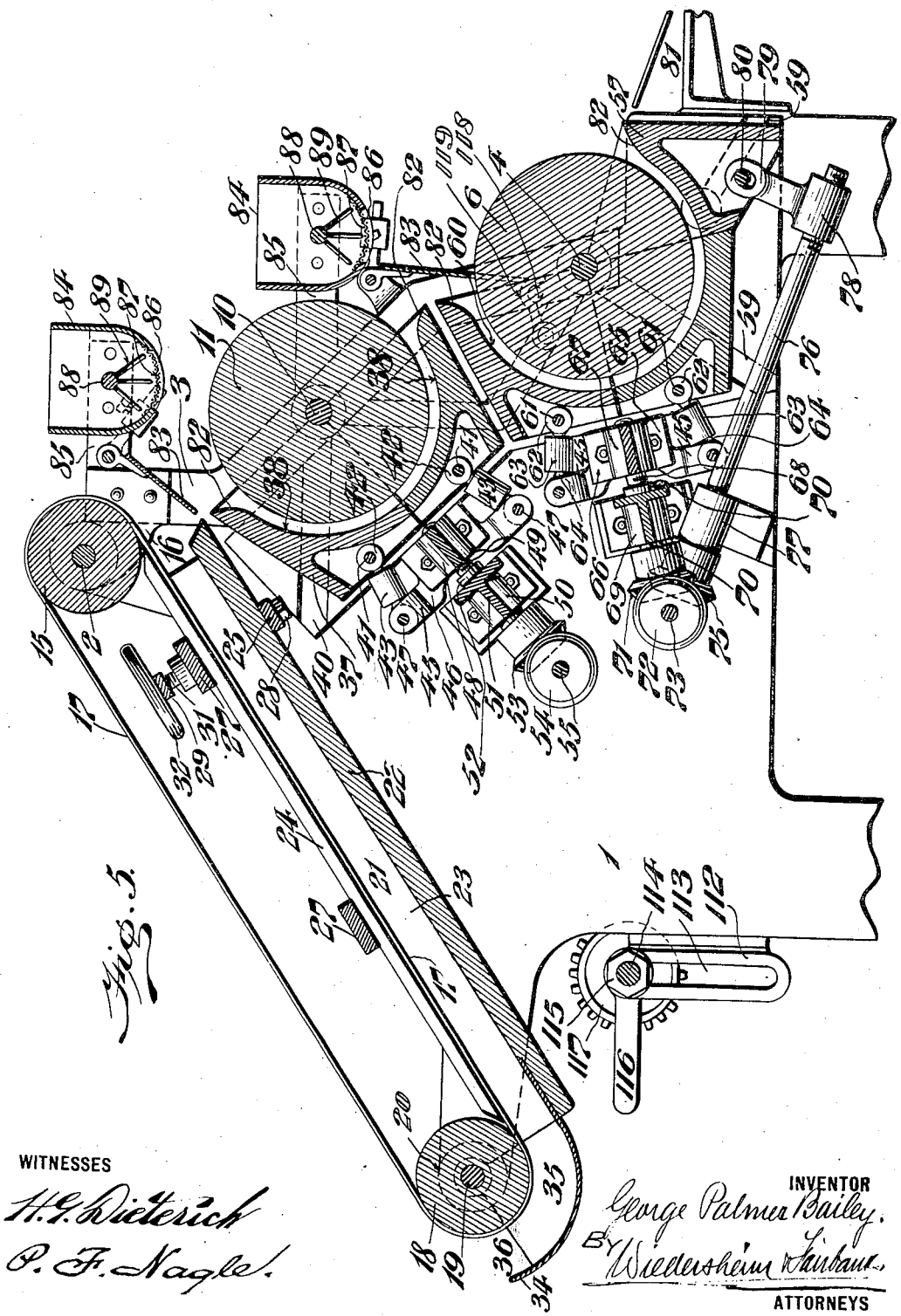

G. P. BAILEY.
DOUGH MOLDING MACHINE.
APPLICATION FILED MAY 10, 1912.
1,057,699.
Patented Apr. 1, 1913.
4 SHEETS—SHEET 1.
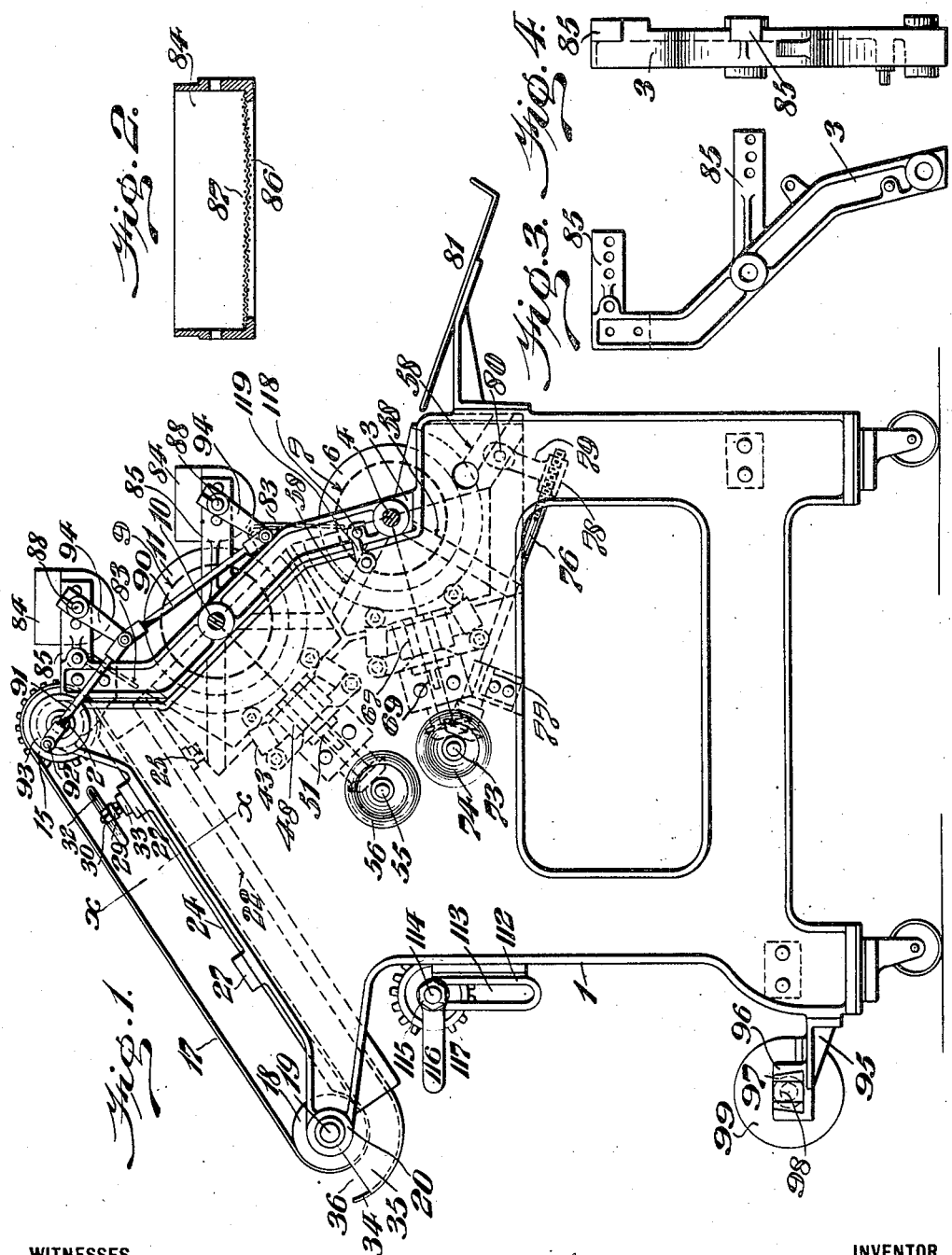
WITNESSES
INVENTOR
George Palmer Bailey,
BY Wiedersheim & Fairbanks
ATTORNEYS

G. P. BAILEY.
DOUGH MOLDING MACHINE.
APPLICATION FILED MAY 10, 1912.

1,057,699.

Patented Apr. 1, 1913.
4 SHEETS—SHEET 2.

WITNESSES
H. G. Dieterich
P. F. Nagle

INVENTOR
George Palmer Bailey
By Wiedersheim Fairbanks
ATTORNEYS

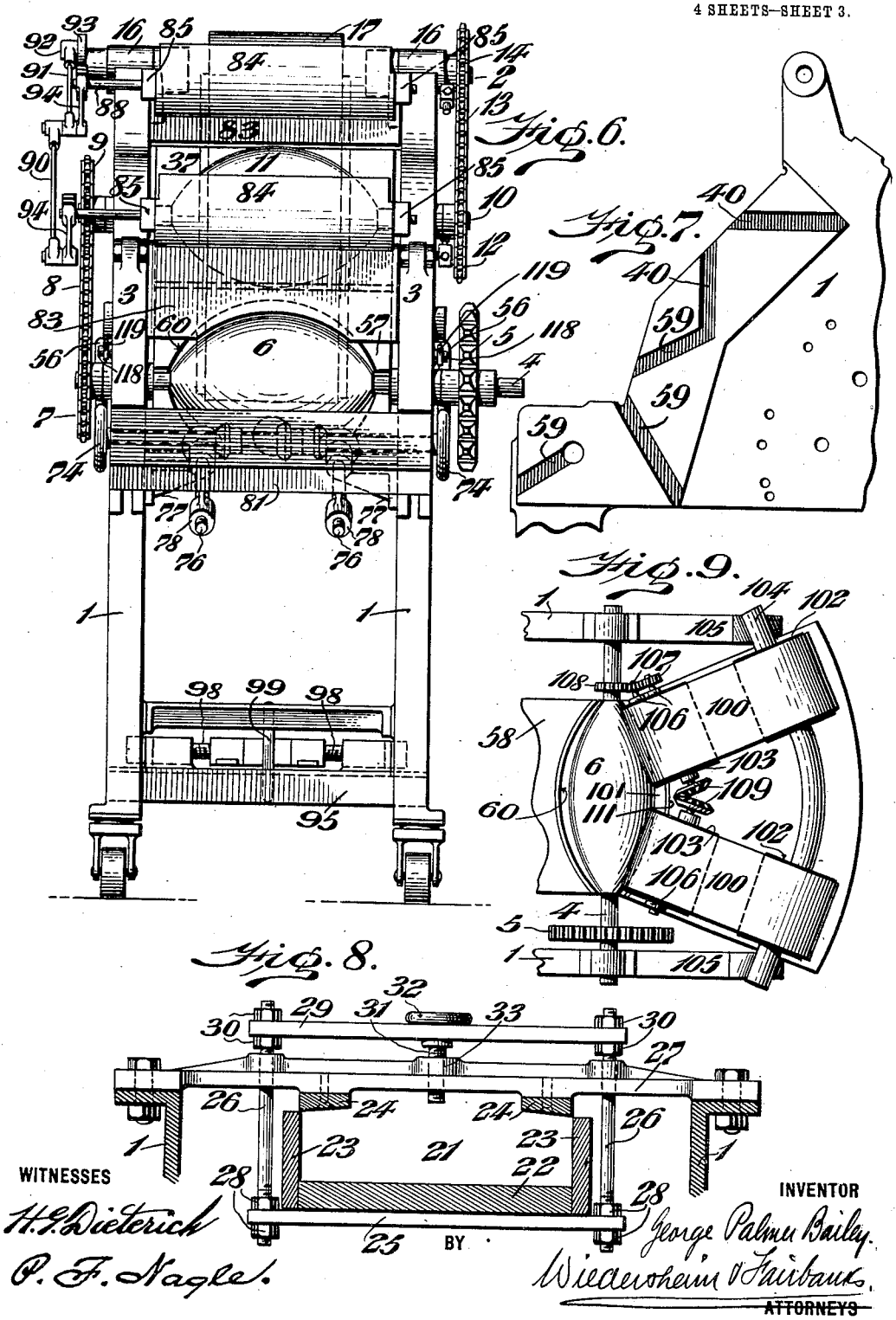

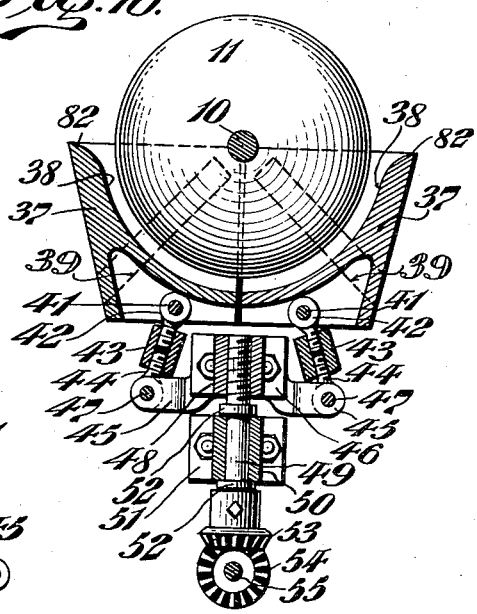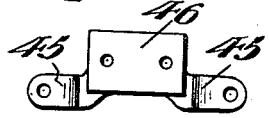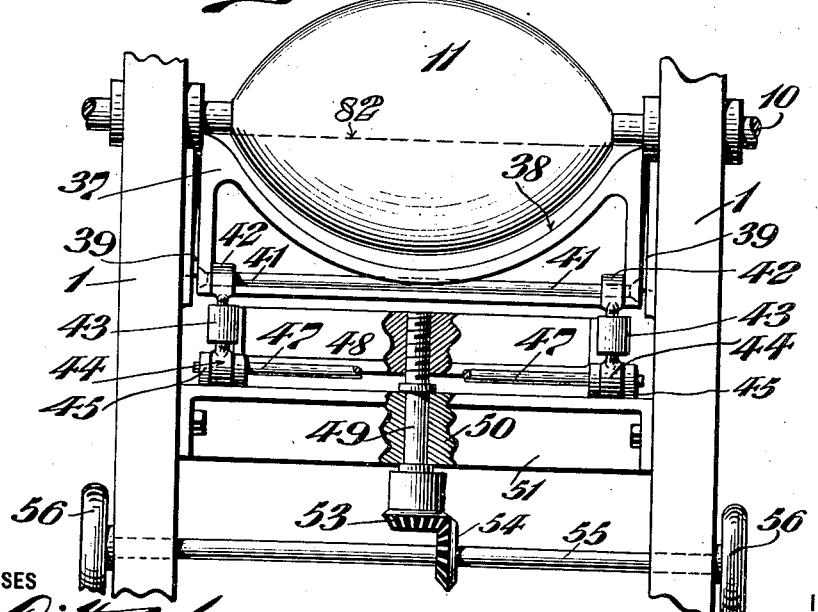

UNITED STATES PATENT OFFICE.

GEORGE PALMER BAILEY, OF PHILADELPHIA, PENNSYLVANIA.

DOUGH-MOLDING MACHINE.

1,057,699.                    Specification of Letters Patent.       Patented Apr. 1, 1913.

Application filed May 10, 1912.   Serial No. 696,316.

*To all whom it may concern:*

Be it known that I, GEORGE PALMER BAILEY, a citizen of the United States, residing in the city and county of Philadelphia, State of Pennsylvania, have invented a new and useful Dough-Molding Machine, of which the following is a specification.

This invention relates to a new and useful dough molding machine, and more particularly to a mechanism for working and forming a mass of dough into a certain shape or conformation, whereby it is made ready for the baking process, and when discharged from the machine is in the desired shape for the particular kind of loaf of bread which is to be made.

In the accompanying drawings I have shown a machine particularly adapted for molding dough into a loaf of elongated shape, having reference particularly to the loaf known at the Vienna loaf, although of course it will be understood that I do not wish to be limited to this specifically, as the machine may be readily adapted for molding loaves of a different shape, and I so contemplate its use in practice.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a machine embodying my invention. Fig. 2 represents a longitudinal section of one of the shifting or distributing receptacles. Fig. 3 represents a side elevation of one of the journal frames for supporting certain movable parts of the mechanism. Fig. 4 represents a front elevation of the same. Fig. 5 represents a vertical section of a portion of the machine. Fig. 6 represents a front elevation of the machine. Fig. 7 represents a detail of construction showing the inner face of one of the side frames. Fig. 8 represents a section on line x—x Fig. 1 showing the conveyer feed bed. Fig. 9 represents a plan of the delivery end of the machine showing a modified construction. Fig. 10 represents a transverse section of one of the forming receptacles and its adjuncts. Fig. 11 represents a detail of a bearing support bracket. Fig. 12 represents a front elevation of the machine partly in section showing the adjusting mechanism for the forming receptacles.

Similar numerals of reference indicate corresponding parts in the figures.

Referring to the drawings:—1 designates the main frame of my novel dough forming machine upon which is carried a rotatable shaft 2 which, in the present instance, serves as a pivotal support for an auxiliary frame 3. This latter frame 3 as will be apparent may be moved toward or away from the main frame 1 as desired and forms a support for certain essential elements of construction which will later be described in detail.

4 designates the main driven shaft rotatably mounted at a suitable point on the auxiliary frame 3 and carrying a sprocket 5 or the like, by means of which power is transmitted from a suitable source. This shaft 4, in the present instance, has secured thereto a substantially ellipsoidal roll 6 which is adapted to rotate therewith and serves, in connection with other adjuncts hereinafter described, as a work roll for forming the dough into a predetermined shape.

7 designates a second sprocket fixed to the shaft 4 and adapted to transmit motion therefrom to a chain 8 which drives a sprocket 9 on a countershaft 10, this latter shaft being also mounted for rotation on the auxiliary frame 3 and likewise carries a roll 11 substantially of the same form as the roll 6 and serving a like purpose. The countershaft 10 in turn transmits motion through a sprocket 12, chain 13 and sprocket 14 to the shaft 2 which has fixed thereto the drum 15 and passes loosely through the ears 16 which serve as a pivotal support for the auxiliary frame 3.

17 designates a belt or bolster which passes about the drum 15 and also about a second drum 18 rotatably mounted in suitable extensions or bearings 20 of the frame 1. This belt or bolster 17 is adapted to pass longitudinally of a channel 21 formed by a bed 22, side walls 23 and overhanging ways 24 which latter serve to properly guide the belt in its travel. The bed 22, in the present instance, serves as a support or table upon which the dough travels and is fed by the action of the belt 17. In order to properly support the bed 22, I preferably mount the same on cross bars 25 adjustably suspended on stay bolts 26 which pass through cross bars 27 carried by the main frame 1, while adjustment is effected by nuts 28 or like devices.

29 designates upper cross bars for joining the ends of the stay bolts 26 and the same are likewise adjusted by nuts 30. It is preferable to provide a means for varying at will the depth of the channel 21 with respect to the belt 17, and for this purpose I have, in the present instance, employed a rotatable stud 31 adapted to be operated by the hand wheel 32 and passing through a threaded boss 33 of the bar 27, and it will thus be seen that by turning the said wheel 32 in the required direction that the bed 22 may be raised or lowered as occasion demands.

34 designates a receiving chute for the dough, preferably fixed to the bed 22 and forming a curved continuation thereof with side plates 35 and an open end 36 adjacent the belt 17.

37 designates a forming receptacle preferably constructed in two sections, the operating face 38 of which is preferably curved and of a contour substantially similar to the curvature of the roll 11 though it will be noted, as shown in Fig. 12, that the said face 38 at its central portion is spaced farther from the said roll 11 than at its ends, since it is desirable in this type of machine to form a loaf thicker at the center than at its ends. This receptacle 37 has each of its sections provided with a projecting flange or guide 39 which are adapted for sliding engagement with ways or grooves 40 formed in the sides of the frame 1, the said grooves being disposed preferably at an angle of 90° in order that the two sections of the receptacle 37 may be moved radially with respect to the roll 11 and so maintain the same relative curvature between the surface 38 and the said roll 11.

In order to effect the aforesaid adjustment, I preferably provide a rod 41 suitably secured in a fixed manner to each section, each rod carrying a pair of eye bolts 42, each of which has threaded engagement with a sleeve 43. These sleeves 43 in turn are similarly connected by eye bolts 44 to a second rod 45 mounted in ears 46 of the yokes 47, the latter being secured at opposite ends of the plate 48 which is preferably apertured and threaded to receive the threaded end of the pin 49. This pin 49 is journaled in a boss or bearing 50 formed in a suitable angle bar 51 fixed to the main frame 1, while longitudinal movement of the pin 49 is prevented through collars 52 secured to the pin and engaging opposite sides of the bar 51.

53 designates a bevel gear fixed to the pin 49 and meshing with a second gear 54 secured to a rod 55 preferably disposed between the sides of the frame 1 and having a hand wheel 56 on each end thereof in order that adjustment of the parts may be made from either side of the machine. It will thus be apparent that the forming receptacle 37 may be moved toward or away from the roll 11 at the will of the operator, so that the thickness of the dough in its passage through the machine may be varied as desired.

57 designates a second forming receptacle located adjacent to and in close proximity to the delivering end of the receptacle 37 and likewise formed in sections operatively positioned with respect to the forming roll 6. As here shown this receptacle 57 is formed in three sections, each of which is provided with a projecting tongue 58 on each end adapted for sliding engagement with the ways 59 which are formed by recessing the sides of the frame 1 in a manner similar to that described for the ways 40. It is preferable also to position the ways 59 at substantially 90° intervals so that the sections of the receptacle 57 may move radially with respect to the axis of the rolls 6 and thus preserve the internal contour of the receptacle 57, which, as shown at 60, conforms substantially to the curvature of the rolls 6. In the present construction two of the sections of the receptacle 57 are controlled by similar adjusting means, and therefore the description of one should suffice for both, while the third section will be independently described.

61 designates a rod transversely disposed at the rear of the receptacle section and carrying at either end an eye-bolt 62 threaded into a sleeve 63 which joins a second eye-bolt 64 carried by an arm 65 of a bracket 66. This bracket 66 forms a support for a threaded member 67 carried by the threaded end of a pin 68 which is rotatably mounted in a bearing 69 fixed to the main frame of the machine, and is prevented from longitudinal movement by collars 70, one of which is secured to the said pin on either side of the bearing 69.

71 designates a bevel gear suitably keyed to the pin 68 and in mesh with a similar gear 72 on a spindle 73 which extends transversely of the machine frame and projects on either side thereof to receive the hand wheel 74 so that the adjusting mechanism may be operated from either side of the machine.

The adjustment of the third section of the receptacle 57 is accomplished, in the present instance, from the same adjusting spindle 130

73 and through the medium of a bevel 75 normally in mesh with the gear 72 and mounted on a spindle 76 carried by the fixed bearing bracket 77. This spindle 76 is preferably provided with a threaded portion carrying a sleeve 78 integral with which, in the present instance, is a slotted arm 79 engaged by the pin 80 of the third section of the receptacle 57. This latter section of the receptacle 57 is the delivery end of the machine and therefore a receiving table 81 is mounted adjacent thereto and is adapted to receive the formed dough as it comes from the machine. In connection with the receptacles 37 and 57 it will be noted that the receiving and delivery ends of each of them is provided with a curved portion 82, in order to facilitate the travel of the dough from the bed 22 to one receptacle, from one receptacle to another and from the last receptacle to the receiving table 81.

83 designates a pair of plates pivotally mounted and suitably counterweighted in order to be normally suspended in the path of the dough during its passage through the machine. The function of these plates is to straighten the dough and cause proper delivery of the same to the adjacent receptacle, and it will be noted that one plate 83 is located between the conveyer mechanism and one receptacle, while the other plate 83 is located between the receptacles. In connection with the last named plate 83 attention is directed to the fact that it is so shaped as to substantially conform to the shape of the roll 6, that is, one edge thereof is cut away on a suitable arc.

In order to prevent clogging of the receptacles 37 and 57 and avoid sticking of the dough while passing beneath the rolls 6 and 11, I preferably mount adjacent to and above each roll a sifter container 84, each of which is fixedly secured to a projecting bracket 85 of the auxiliary frame 3. These containers are each provided with a longitudinally disposed opening 86 in the bottom thereof which is covered with a perforated plate or screen 87, which permits the flour or other material to sift through and drop upon the rolls as desired. An agitating device is preferably mounted in each container 84 and comprises, in the present instance, a rock-shaft 88 longitudinally disposed within each container and carrying thereon a plurality of fingers 89, preferably arranged in staggered relation and adapted to break up the material and maintain it in condition for proper sifting action. The rods 88 are continuously actuated during the operation of the machine by means of reciprocating crank rods 90 and 91, the latter being connected to a crank pin 92 of a disk 93 on the shaft 2, and the former having secured thereto crank arms 94 which are fixed to the rock-shafts 88, respectively.

It may be desirable in the use of my novel forming machine to operate the same in connection with certain types of mixing or molding machines, and for this purpose I provide an attachment device whereby the two machines can be fixedly secured together so that the product of one is delivered directly to the other. This mechanism, in the present instance, comprises a bracket 95 transversely disposed of the frame 1 and projecting a suitable distance therefrom and serving as a support for a pair of guides 96. Within these guides 96 is located a clamping jaw 97 having screw threaded engagement with a threaded rod 98, the latter being provided at one end with a right hand screw thread and at the other end with a left hand screw thread, whereby rotation of the said rod 98 causes the two clamping jaws 97 to move toward or away from each other, causing in one direction of movement a releasing of the clamping action and in the opposite direction a clamping action. The action will readily be understood when it is explained that these jaws 97 are brought into position between the legs of an adjacent machine and then moved outwardly to interlock with the frame of the adjacent machine. Rotation of the rod 98 is effected by means of a hand wheel 99 keyed or otherwise fixedly secured to the said feed member.

In Fig. 9 I have shown a modification which may be used in some instances at the delivery end of the machine, and preferably positioned adjacent the discharge of the receptacle 57. This mechanism comprises a pair of conveyer belts 100 suitably mounted with one end of each in close proximity to the roll 6 and projecting over the discharge opening 101 of the receptacle 57, and from which position the two belts diverge, thereby rolling the dough to form a longer loaf than would be delivered from the receptacle 57 without this said mechanism. These belts 100 are mounted for rotation on suitable rolls or drums 102 and 103, the former pair being rotatably carried by a shaft 104 mounted on extensions 105 of the frame 1, and the latter suitably mounted in bearings 106 and driven by a chain of gears 107 from gear 108 on the shaft 4. Motion is transmitted from one conveyer belt to the other by means of a bevel gear connection 109. 110 designates a table suitably supported beneath the belts 100 and having the edge 111 thereof cut away to conform to the shape of the receptacle 57 at its discharge point. It will thus be seen that after the dough has been formed by passing through the several receptacles, it discharges upon the table 110 and is there subjected to a further working by the moving belts 100. 112 designates a bracket fixed to the front portion of the frame 1 and having a slot 113 therein within which the shaft 114 is adapted to seat and be secured through the medium of a clamp member 115 operated by the handle 116. This shaft 114 carries an idle sprocket 117 thereon which is adapted for engagement with the driving chain (not shown) by which the sprocket 5 is driven in cases where the adjacent machine is utilized to furnish the driving power. Movement of the shaft 114 within the bracket 112 will cause the desired tension of the driving chain as will be apparent.

Before taking up the detailed explanation of the operation of the device, attention is directed to the fact that when the machine is used in its preferred form, that is, to form a Vienna loaf, the dough, before its delivery to my novel machine, has first been proved and molded into a substantially cylindrical shape which is formed by spirally rolling a sheet of dough and molding it into the aforesaid shape. In this substantially cylindrical shape it is ready for the molding operation in the machine which I have devised for this purpose, and the desired function of which is to taper the dough from substantially the middle portion thereof toward the ends and produce the loaf known as Vienna.

The operation of the machine is as follows:—The parts of the machine are first of course suitably adjusted with respect to each other in order to produce the result desired and the machine is then connected through the medium of the clamping device 97 with an adjacent machine, provided one is to be used in connection therewith, and so positioned as to bring the conveyer mechanism and its receiving chute 34 into operative relation with the aforesaid machine. With the machine so arranged and the moving parts receiving power, the quantities of molded dough are delivered one at a time at suitable intervals into the chute 34, from which they are carried by the bolster or feed belt 17 upwardly along the inclined bed 22 to the discharge end thereof. At this point the dough cylinder is discharged and contacts with the straightener plate 83 and the weight of the dough overbalances the counterweight and causes the said plate to swing about its pivot and direct the dough into the receptacle 37 and in contact with the face of the roll 11. The rotation of the said roll 11 kneads or works the dough roll gradually drawing the same from the center toward the ends, thereby forming an initial tapering shape and delivering the partially formed dough to the second straightener plate 83 at which point it is some three or four inches longer than when it entered the receptacle. The action and function of this second plate 83 are exactly similar to those described for the former plate, except at this time, owing to the double taper of the loaf, the plate causes a slight curvature of the longitudinal axis of the dough roll so that the same conforms substantially to the curvature of the roll 6 upon which it is deposited by the automatic swinging of the plate 83. The dough roll now passes through the receptacle 57 and is further elongated, worked and tapered so that when it is delivered upon the receiving table 81 it is in the required form to bake into a Vienna loaf. If it is desired to form a loaf longer than the usual Vienna, the modification shown in Fig. 9 may be employed and it will readily be seen that the action of the diverging belts 100 is substantially that of a pair of hands which work and roll the dough out in the desired form.

During the operation which has just been described it will of course be understood that the containers 84 are continuously sifting flour or the like upon the respective rolls in order to prevent sticking of the dough in passing through the receptacles.

The independent means for adjusting each receptacle and each section of the receptacles is an important feature as thereby it is possible to vary to the desired extent the tapering or working action of the rolls and thus cause variations in the shape of the finished product.

Attention is directed to the auxiliary frame 3 and its pivotal action as thereby it is possible to entirely remove both of the rolls 6 and 11 from the forming receptacles in order to permit the parts to be cleaned and scraped so that the machine may be maintained at all times in good working order. Of course it will be understood that any desired means for fastening or securing the auxiliary frame in operative position may be employed, and for this purpose I provide a lug 118 thereon with which a pivoted latch 119 is adapted to coöperate.

In the making of Vienna loaves it has heretofore been the practice to mold and form the quantities of dough entirely by hand, and in the commercial manufacture of this product the spirally rolled cylindrical quantities of dough are delivered to a traveling conveyer of sufficient length to allow twenty or more men to stand on each side thereof and the duties of these men are to remove the formed rolls of dough and work them up into tapered elongated forms ready for the baking process.

In my present invention I have devised a machine embodying a complete unitary structure adapted to stretch, mold and taper, entirely automatically, a cylindrical roll of dough so that it is delivered from the machine in a perfect shape for baking into a Vienna loaf and whereby the tedious lengthy hand process heretofore in vogue is dispensed with. It will furthermore be apparent that in view of the fact that one roll of dough follows after another in rapid succession, the output of the machine is extremely large, rapid and the formation of each roll is accomplished in a minimum of time.

It will now be apparent that I have devised a novel and useful construction of a dough molding machine which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a dough molding machine, a frame, a plurality of forming receptacles mounted thereon, a roll rotatably mounted for movement in each receptacle, a driving mechanism for said rolls, and means to remove said rolls out of operative position with respect to said receptacles.

2. In a dough molding machine, a frame, a plurality of forming receptacles mounted thereon, a roll rotatably mounted for movement in each receptacle, an auxiliary frame pivotally carried by said main frame and supporting said rolls in operative position, and means to vary the position of said receptacles with respect to said rolls.

3. In a dough molding machine, a main frame, a plurality of forming receptacles movably mounted thereon, a roll rotatably mounted for movement in each receptacle and normally spaced therefrom, a conveyer mechanism for delivering a predetermined quantity of dough to one receptacle, a straightener device located between said mechanism and said receptacles, driving mechanism for said rolls, and means to vary the position of said receptacles with respect to said rolls.

4. In a dough molding machine, a main frame, a plurality of forming receptacles movably mounted thereon, a roll rotatably mounted for movement in each receptacle and normally spaced therefrom, a straightener device located in the path of movement of a quantity of dough and between said receptacles, a conveyer mechanism for delivering a predetermined quantity of dough to one receptacle, driving mechanism for said rolls, and means to vary the position of said receptacles with respect to said rolls.

5. In a dough molding machine, a main frame, a plurality of forming receptacles mounted thereon, a roll rotatably mounted for movement in each receptacle and normally spaced therefrom, means to rotate said rolls to feed a quantity of dough through said receptacles, a conveyer mechanism for delivering a predetermined quantity of dough to one receptacle, and a straightener device located between said receptacles and said conveyer mechanism and in the path of movement of said dough.

6. In a dough molding machine, a main frame, a plurality of forming receptacles mounted thereon, a roll rotatably mounted in each receptacle and normally spaced therefrom, means to rotate said rolls to feed a quantity of dough through said receptacles, a conveyer mechanism for delivering a predetermined quantity of dough to one receptacle, and a straightener device located between said receptacles and in the path of movement of said dough.

7. In a dough molding machine, a main frame, a plurality of substantially ellipsoidal shaped rolls rotatably mounted thereon, a dough forming receptacle for each roll and adapted to partially inclose said roll, a driving mechanism for said rolls, and means to vary the position of one of said receptacles with respect to its roll.

8. In a dough molding machine, a main frame, a plurality of substantially ellipsoidal shaped rolls rotatably mounted thereon, a dough forming receptacle for each roll having a surface substantially of the same curvature as said rolls and adapted to partially inclose said rolls, a driving mechanism for said rolls, and means to vary the position of one of said receptacles with respect to its roll.

9. In a dough molding machine, a main frame, a plurality of substantially ellipsoidal shaped rolls rotatably mounted thereon, a dough forming receptacle for each roll and adapted to partially inclose said roll, a driving mechanism for said rolls, and independent means to vary the position of each of said receptacles with respect to said rolls respectively.

10. In a dough molding machine, a main frame, a plurality of substantially ellipsoidal shaped rolls mounted thereon, a dough forming receptacle for each roll adapted to partially inclose said roll, and a driving mechanism for said rolls.

11. In a dough molding machine, a main frame, a plurality of substantially ellipsoidal shaped rolls rotatably mounted thereon, a dough forming receptacle for each roll having a surface substantially of the same curvature as said rolls and adapted to partially inclose said rolls, and a driving mechanism for asid rolls.

12. In a dough molding machine, a main frame, a plurality of forming receptacles mounted thereon, a roll rotatably mounted for movement in each receptacle and normally spaced therefrom, driving mechanism for said rolls, a conveyer mechanism for delivering a predetermined quantity of dough to one of said receptacles, and a dough working and stretching device operatively positioned adjacent the discharge of one of said receptacles.

13. In a dough molding machine, a main frame, a plurality of forming receptacles mounted thereon, a roll rotatably mounted for movement in each receptacle and normally spaced therefrom, driving mechanism for said rolls, a conveyer mechanism for delivering a predetermined quantity of dough to one of said receptacles, a receiving table operatively positioned adjacent the discharge of one of said receptacles, and a dough working and stretching device interposed between said discharge receptacle and said receiving table.

GEORGE PALMER BAILEY.

Witnesses:
 ROBERT M. BARR,
 C. D. McVAY.